United States Patent [19]
Rubin

[11] 3,973,524
[45] Aug. 10, 1976

[54] FUEL CONVERSION SYSTEM

[76] Inventor: David Rubin, 5 Rav Zair St., Jerusalem, Israel

[22] Filed: Nov. 4, 1974

[21] Appl. No.: 520,378

[52] U.S. Cl. .............................. 123/3; 48/197 FM; 48/199 FM; 123/1 A; 123/41.42; 123/119 E
[51] Int. Cl.² ....................... F02B 43/00; F01P 7/16
[58] Field of Search............ 123/1 A, 3, 34 R, 34 A, 123/DIG. 12, 41.42, 41.1, 41.22; 48/DIG. 8, 199 FM, 197 FM, 102 A, 212, 213

[56] References Cited
UNITED STATES PATENTS

| | | | |
|---|---|---|---|
| 655,111 | 7/1900 | Plecher | 123/119 E |
| 1,128,549 | 1/2915 | Tait | 48/DIG. 8 X |
| 1,833,552 | 11/1931 | Balachowsky et al. | 123/119 E |
| 1,896,401 | 2/1933 | Godward | 123/41.42 |
| 2,206,685 | 7/1940 | Balachowsky | 123/119 E |
| 2,660,521 | 11/1953 | Teichmann | 48/213 X |
| 3,759,679 | 9/1973 | Franz et al. | 48/213 |
| 3,828,736 | 8/1974 | Koch | 123/3 |

FOREIGN PATENTS OR APPLICATIONS 1,276,410   8/1968   Germany .............................. 123/3

Primary Examiner—Charles J. Myhre
Assistant Examiner—Tony Argenbright
Attorney, Agent, or Firm—Ostrolenk, Faber, Gerb & Soffen

[57] ABSTRACT

A fuel conversion system is provided in which a petroleum fraction is circulated past the outside of the cylinders of an internal combustion engine in contact with a cracking catalyst to thereby crack the fuel as a result of the combined action of the catalyst and the heat imparted to the fuel through the cylinder walls, simultaneously providing oxygen and hydrogen to the fuel, circulating the resulting fuel to the interior of the cylinders where it is burned to drive the cylinders' piston.

9 Claims, 1 Drawing Figure

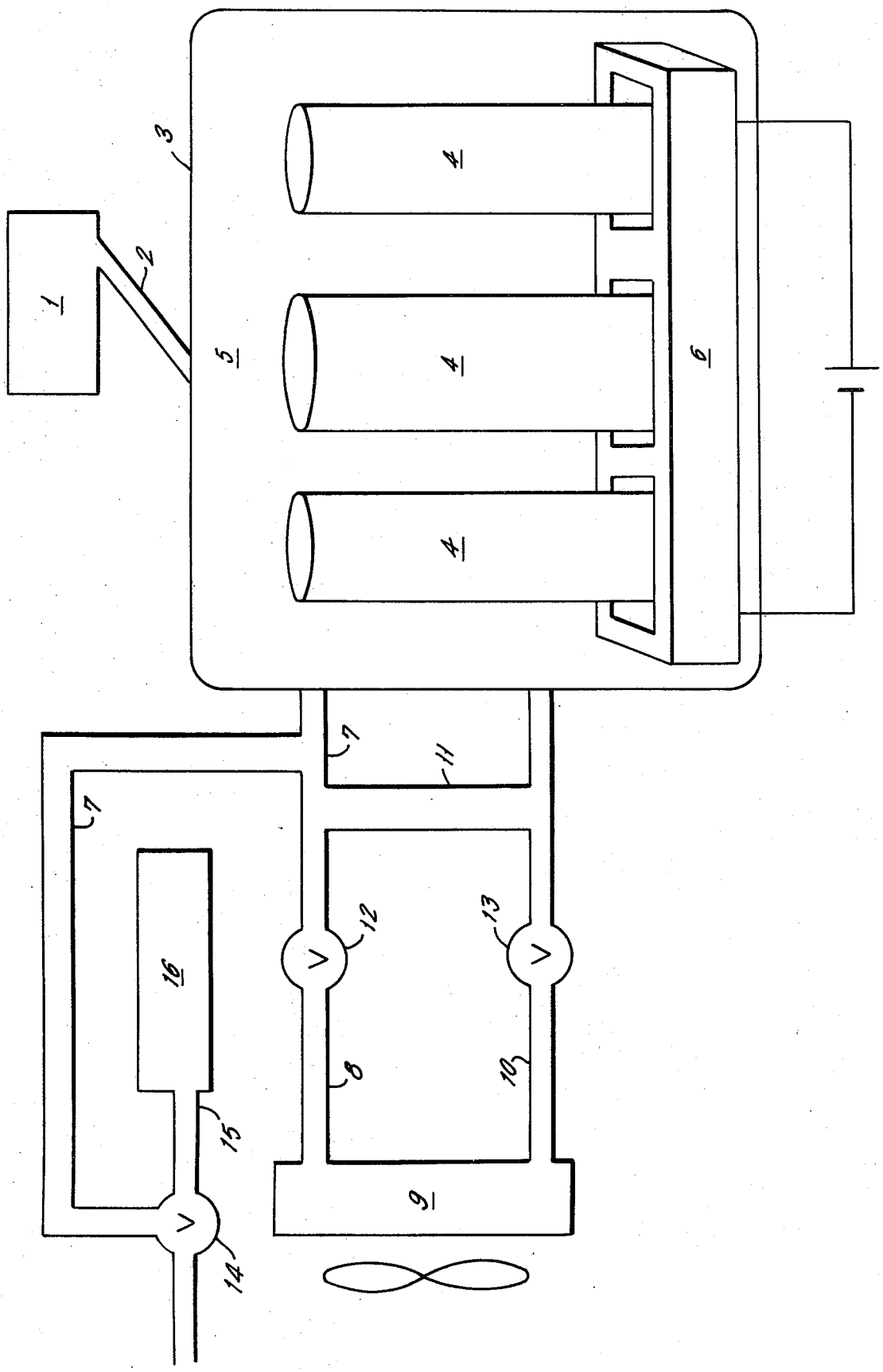

FUEL CONVERSION SYSTEM

BACKGROUND OF THE INVENTION

Petroleum is conventionally separated by distillation into various fractions resulting in a rough separation according to carbon number as a result of the relationship between the boiling point and molecular weight of the petroleum constituents. The natural gasoline, after appropriate treatment, is used in those internal combustion engines that require a fairly volatile fuel, kerosene is used in tractor and jet engines, and gas oil is used in diesel engines. The kerosene and gas oil are also used for heating purposes, the latter being familiarly known as "furnace oil". In the refinery, certain petroleum fractions are cracked to convert the higher alkenes into smaller alkanes and alkenes and thus increase the yield of gasoline.

In the internal combustion engine, the gasoline is ignited by use of a spark plug. This process involves the reaction of the alkanes with oxygen to form carbon monoxide, carbon dioxide, water, and heat by means of a free radical chain reaction. The reaction is extremely exothermic but also requires a very high temperature for its ignition. In other words, a great deal of activation energy is required for the reaction to begin and once this energy level is achieved, the subsequent chain carrying steps proceed rapidly and with the evolution of energy. In order to prevent overheating, the internal combustion engine is provided with a cooling circuit. In the circuit, cooling water is circulated past the exterior of the cylinders to the radiator, where the heat is given off into the surrounding atmosphere, and then the cooling water is recirculated to the space surrounding the cylinders. It is apparent that a great deal of the heat energy created by burning the gasoline in the cylinders is necessarily lost with a resulting decrease in the efficiency of the engine.

Various proposals have been made to utilize the heat energy usually lost through the radiator. For example, it has been previously proposed to circulate the gasoline past the exterior of the cylinders so that it will absorb the heat being generated through the cylinder walls in order to vaporize the liquid fuel before introduction into the cylinders and to result in increased burning efficiency.

It is the object of this invention to provide a novel fuel conversion system which can utilize kerosene and other petroleum fractions for an internal combustion engine and eliminate the necessity for a cooling circuit. This and other objects of the invention will become apparent to those of ordinary skill in the art from the following detailed description in which the FIGURE is a schematic flow diagram of the fuel conversion system of this invention.

SUMMARY OF THE INVENTION

This invention relates to a fuel conversion system and more particularly to a fuel conversion system which involves circulating a petroleum fraction such as kerosene and/or gas oil past the outside of the cylinders of an internal combustion engine in contact with a cracking catalyst to thereby crack the fuel as a result of the combined action of the catalyst and heat imparted to the fuel through the cylinder walls, while simultaneously providing oxygen and hydrogen to the fuel, and thereafter circulating the resulting fuel to the interior of the cylinders where it is burned.

DESCRIPTION OF THE PREFERRED EMBODIMENTS

Referring to the FIGURE, the fuel to be converted is stored in a fuel tank 1. The fuel can be any paraffinic fraction capable of being converted into gasoline, such as kerosene and gas oil. The fuel is conveyed from the tank 1 through line 2 by a pump (e.g., the pump normally used to pass fuel from the tank to the carburetor, not shown) into the cylinder block 3 where it is sprayed onto the external surface of the cylinders 4. It will be recognized that the fuel is being introduced into the space 5 in which cooling water is usualy circulated in a conventional internal combustion engine. The burning of gasoline within the cylinders creates, as usual, a large amount of heat which is radiated through the cylinder walls. This heat is absorbed by the liquid fuel causing it to vaporize. In this way, the radiation energy normally lost in a conventional internal combustion engine is utilized to provide the energy for vaporization and to increase the potential energy of the fuel.

In a refinery, gasoline is produced by the pyrolysis of alkanes in a process known as cracking. A suitable paraffinic fraction containing the alkanes, usually the kerosene and gas oil fractions, are simply passed through the chamber heated to 400°–600°C., generally in the presence of a suitable cracking catalyst. The products are alkanes of smaller carbon atom chains than the initial alkenes, various alkenes and some hydrogen. The breaking of the large molecules in the paraffinic fractions into smaller ones increases the yield of gasoline from petroleum. Since alkenes, which constitute a large proportion of the cracked product have good anti-knocking qualities, the cracking process also improves the gasoline. Additionally, through the process of alkylation, certain of the smaller alkanes and alkenes are converted into high octane synthetic fuels. It will be appreciated that the vaporized fuel within the empty space 5 of engine block 3 is in appropriate condition to be cracked into gasoline. An appropriate temperature has been provided by the heat radiated through the walls of cylinders 4. Accordingly, in order to crack the vaporized fuel, a suitable cracking catalyst is provided within space 5. Any of the known cracking catalysts can be employed such as a copper or nickel powder. Thus, the conversion of kerosene or gas oil into gasoline which is usually performed at the refinery is now being performed within the internal combustion engine.

Also provided within the internal space 5 of engine block 3 is a closed electrolysis unit 6. The electrolysis unit 6 is generally located in the lower portion of engine block 3 and is used to form hydrogen and oxygen by electrolysis of an appropriate electrolyte. For example, the electrolyte may suitably be a solution of sulfuric acid in water. The gaseous oxygen and hydrogen produced within electrolysis unit 6 are introduced into the open space 5 of the engine block 3 where they mix with the cracked fuel. This will result in the presence of a greater amount of hydrogen in the cracked product than normally encountered which, in turn, will result in the saturation of a greater amount of the alkenes produced during the cracking reaction and thereby improve the quality of the fuel. It will be further recognized that the resulting fuel also contains a significant amount of oxygen.

The fuel which is now in appropriate condition for burning in the internal combustion engine is conveyed from space 5 to the carburetor through line 7 where it is mixed with air and returned to the cylinders 4 for burning in the usual manner. The ignition will be much more efficient than in a conventional engine because the fuel/air mixture contains a greater proportion of oxygen and in this condition, the carbonated acids and carbon produced will be oxidized to carbon dioxide (e.g., $2CO+O_2 \rightarrow 2CO_2$).

In order to maintain optimal conditions for the cracking reaction within space 5, a bypass and return system is provided. This system comprises a take-off line 8 which is connected to a radiator 9 which in turn is connected to a return line 10 communicating with open space 5. Additionally, a bypass line 11 is provided to connect take-off line 8 and return line 10. A valve 12 is provided in take-off line 8 between the bypass line 11 and radiator 9. A valve 13 is provided in return line 10 between radiator 9 and bypass line 11. Valves 12 and 13 are conveniently bimetal thermal valves and are designed to be temperature (and/or pressure) sensitive. When the temperature in the open or cracking space 5 exceeds a predetermined level, valves 12 and 13 open so that a portion of the gases will be conveyed to radiator 9 where they are cooled and expanded in the conventional manner and then recirculated to open space 5 thereby lowering the temperature within open space 5. When the temperature within open space 5 is below the predetermined value, valves 12 and 13 are closed thereby isolating the radiator. The predetermined temperature at which valves 12 and 13 will open is, of course, adjusted in accordance with the particular fuel being utilized.

When the engine is first started, the fuel emanating from space 5 is not appropriate for ignition in cylinders 4. Accordingly, a valve 14, suitably a bimetal thermal valve, is provided in line 7 so as to prevent the fuel from being conveyed to the carburetor and thence to the cylinders. Also connected to valve 14 is another line 15 which in turn communicates with a second fuel tank 16 in which conventional gasoline is stored. When valve 14 prevents the fuel from open space 5 from being conveyed to the carburetor, the conventional gasoline in tank 16 is conveyed to the carburetor through line 15, valve 14 and line 7. This conventional gasoline is burned in cylinders 4 causing radiation of heat through the cylinder walls into open space 5 and creating an appropriate temperature for the cracking reaction. As soon as the fuel emanating from space 5 through line 7 is in appropriate form for ignition, valve 14 reverses positions isolating tank 16 from the carburetor and allowing communication between open space 5 and the carburetor through line 7 and valve 14.

The fuel conversion system of the instant invention has numerous advantages over the conventional internal combustion engine. The fuel used is kerosene or any other paraffinic fraction which can be converted into gasoline rather than refined gasoline. The gasoline which is ignited in the cylinders will have a variable octane value proportional to the engine load since the faster the engine is working, the more heat will be generated to open space 5 and the increased heat will increase the amount of cracking. Because of the oxidation and reduction occuring in the fuel conversion process, the undesirable by-products of the fuel ignition which cause air pollution will be much lower in comparison to the standard engine. Additionally, the efficiency of the engine will be higher than a standard engine because instead of the loss of energy in the form of heat through the radiator in the standard engine, the heat will be used in vaporizing the fuel and in the cracking process. Moreover, the engine comes to its full operating efficiency without a significant warm-up period and due to the elimination of the cooling water, antifreeze is no longer necessary.

The instant invention also has the advantage that standard engines can be easily converted into the instant process. For example, the engine in a 1965 Ford Taunus 12M was modified by using copper pipes with injection eyes in chamber 5, and by using cribriform (holed) stainless steel pipes as electrodes for the electrolysis unit which was supplied with current from the battery.

The fuel tank of the car was filled with kerosene which was sprayed against the external surfaces of the cylinders at the rate of 1–5 cc/sec. Also located in this open space surrounding the cylinders was a cracking catalyst, namely copper powder. The resulting fuel efficiency was found to be 14 kilometers per liter kerosene as opposed to 10 kilometers per liter using conventional gasoline.

Various changes and modifications can be made in this invention without departing from the spirit and the scope thereof. The embodiments set forth herein were for the purpose of illustration only and were not intended to limit the invention.

I claim:

1. In a method of producing mechanical work by burning a fuel in an internal combustion engine by introducing the fuel into the cylinders and igniting the fuel therein, the improvement which comprises circulating a petroleum fraction capable of being cracked into gasoline past the outside of said cylinders in contact with a cracking catalyst to thereby crack the fraction, providing oxygen and hydrogen to the cracked fraction, and thereafter circulating the resulting cracked fraction to the interior of the cylinders.

2. The process of claim 1 wherein the petroleum fraction is kerosene or gas oil.

3. The process of claim 1 wherein the hydrogen and oxygen are provided by electrolysis.

4. The process of claim 1 wherein the cracked fuel is conveyed to a carburetor and from the carburetor to the interior of the cylinders.

5. The process of claim 1 wherein the cracking catalyst is copper, nickel or cadmium.

6. In an internal combustion engine comprising a fuel tank, a carburetor, cylinders, and a cooling circuit comprising a radiator communicating with an enclosed space surrounding the exterior surfaces of the cylinders, the improvement which comprises placing said fuel tank in communication with the space surrounding the exterior surfaces of said cylinders, connecting said carburetor with said space, and providing isolating valves in the communication between the radiator and said space.

7. The internal combustion engine of claim 6 further comprising a closed electrolysis unit within said space.

8. The internal combustion engine of claim 6 wherein said space commumicates with said carburetor through a valve, a second fuel tank communicating with the carburetor through the same valve, said valve being adapted to allow communication to the carburetor to only one of said space and said second fuel tank at any given period of time.

9. In a method of producing mechanical work by burning a fuel in an internal combustion engine by introducing the fuel into the cylinders and igniting the fuel therein, the improvement which comprises circulating a petroleum fraction capable of being cracked into gasoline past the outside of said cylinders in contact with a cracking catalyst to thereby crack the fraction and thereafter circulating the resulting cracked fraction to the interiors of the cylinders, wherein excess heat is removed from the cracked fuel by circulating a portion of said fuel to a radiator.

* * * * *